United States Patent
Lo (10) Patent No.: US 10,275,325 B2
(45) Date of Patent: Apr. 30, 2019

(54) METHOD OF SITE ISOLATION PROTECTION, ELECTRONIC DEVICE AND SYSTEM USING THE SAME METHOD

(71) Applicant: WeiXu Technology Co., Ltd., Zhubei, Hsinchu County (TW)

(72) Inventor: Horatio Lo, Zhubei (TW)

( * ) Notice: Subject to any disclaimer, the term of this patent is extended or adjusted under 35 U.S.C. 154(b) by 375 days.

(21) Appl. No.: 15/185,608

(22) Filed: Jun. 17, 2016

(65) Prior Publication Data

US 2017/0364419 A1    Dec. 21, 2017

(51) Int. Cl.
| | |
|---|---|
| G06F 11/16 | (2006.01) |
| G06F 11/20 | (2006.01) |
| G06F 11/22 | (2006.01) |
| G06F 11/30 | (2006.01) |

(52) U.S. Cl.
CPC ...... G06F 11/1658 (2013.01); G06F 11/2028 (2013.01); G06F 11/2046 (2013.01); G06F 11/2289 (2013.01); G06F 11/3006 (2013.01)

(58) Field of Classification Search
CPC .............. G06F 11/2028; G06F 11/2005; G06F 11/2007; G06F 11/2046; G06F 11/2092
See application file for complete search history.

(56) References Cited

U.S. PATENT DOCUMENTS

| | | | |
|---|---|---|---|
| 6,883,065 B1* | 4/2005 | Pittelkow | G06F 11/0727 709/206 |
| 2005/0102549 A1* | 5/2005 | Davies | G06F 11/201 714/4.1 |
| 2008/0288671 A1* | 11/2008 | Masuda | G06F 3/0614 710/38 |
| 2014/0075017 A1* | 3/2014 | Wang | G06F 9/50 709/224 |
| 2015/0301880 A1* | 10/2015 | Allu | G06F 11/0709 714/4.3 |

* cited by examiner

*Primary Examiner* — Jigar P Patel
(74) *Attorney, Agent, or Firm* — Haynes and Boone, LLP (57) ABSTRACT

A method of site isolation protection includes the following steps. A set of clustered engines including a first engine at a first site and a second engine at a second site is provided. A Fiber Channel (FC) connection and an Ethernet connection between the first and the second sites are provided. Whether an Ethernet Heartbeat (EH) from one of the first engine and the second engine through the Ethernet connection exists is detected when the FC connection fails. One of the first engine and the second engine is shut down when the EH exists. Furthermore, a quorum service at a client site is provided in different IP domain to further protect site isolation from happening, while the FC connection and Ethernet Heartbeat connection failed at the same time.

19 Claims, 4 Drawing Sheets

METHOD OF SITE ISOLATION PROTECTION, ELECTRONIC DEVICE AND SYSTEM USING THE SAME METHOD

FIELD OF THE INVENTION

The present invention generally relates to a method of site isolation protection. More particularly, the invention relates to a method of site isolation protection in a storage area network (SAN) system.

BACKGROUND OF THE INVENTION

SAN systems are primarily used to enhance the accessibility and availability of the data preserved in storage devices, such as disk arrays, tape libraries and optical jukeboxes, to the servers collaborating with the storage devices so that the storage devices appear to be locally attached devices to the servers or the operating system(s) within the servers in an enterprise situation. Therefore, a SAN system typically has its own network of storage devices that are generally not accessible through the local area network (LAN) by other devices. Because of the lowered cost and complexity of SAN systems, SAN systems are widely employed from the enterprise level to small businesses in the early 2000s.

A basic SAN system includes three major components: a SAN switch, a plurality of storage devices and at least one server. High-speed cables with the fiber channel (FC) technology are used to connect the various components together. In most real-world situations, a SAN system includes many different switches, storage devices and servers, and it may further include routers, bridges and gateways to extend the function of the SAN system. Therefore, the topology of a SAN system depends on its size and purpose, and the complexity of the topology of SAN systems has evolved as time goes by.

The disclosed SAN system includes a number of servers coupled with a number of storage devices via a number of SAN switches, wherein an availability device connects to the SAN switches, such that the availability device can communicate through the SAN switches to manage the various routes between the servers and storage devices. Through this management, the accessibility and availability between the servers and storage devices are implemented. An availability device includes a number of special purpose devices, called "availability engines", which are clustered together to manage the storage devices mounted on the SAN system.

An event can occur in a situation where the FC connections between two clustered engines are broken, while both engines can still detect their respective local FC nodes, for example, servers and storage devices located at its own site. The event is called an isolation of FC connectivity or "FC isolation".

A high availability (HA) engine is designed to take over the engine cluster in the event of a disastrous situation where the remote site goes down. An FC isolation scenario will cause a situation where a local engine cannot detect a remote engine at the other site, therefore the local engine considers the remote engine at the other site is down. As a result of the FC isolation, both engines continue operation with their local FC nodes, i.e., data synchronization between the local site and the remote site will diverge. This condition is called "split-brain".

When a split-brain condition occurs, each engine will consider the local mirror at the same site as active, while the mirror members at the other site as missing. With each site continuing to operate under the assumption that the other site is down, mirror members will begin to diverge due to ongoing local-host write, through local FC switch, to local storage. Thus, the mirror members' content will become inconsistent with each other. This can be dangerous and undesirable. In addition, the effects of these problems usually won't become obvious immediately. Host IO at each site will continue to run as if normally, without any indication that the data is "split-brained".

Therefore, there is an expectation that a method of site isolation protection, electronic device and system using the same method to solve split-brain problems between different sites.

SUMMARY OF THE INVENTION

The present invention discloses a method of site isolation protection, comprising steps of: providing a set of cluster engines that include a first engine at a first site and a second engine at a second site; providing a Fiber Channel (FC) connection and an Ethernet connection between the first and the second sites; detecting whether an Ethernet Heartbeat (EH) from one of the said two engines through the Ethernet connection exists when the FC connection fails; and shutting down one of the said two engines when the EH exists.

In accordance with an aspect of the present invention, a system having site isolation protection, comprising a set of engines deployed at at-least-two sites; a first transmission connection between the at-least-two sites; a second transmission connection transmitting at least one transmission heartbeat (TH) between the at-least-two sites; and a service detecting at least one of a first state of the first transmission connection and a second state of an existence of the at-least-one TH, and issuing a specific command to the set of engines when the service determines that at least one of the first state and the second state meets a specific criterion.

In accordance with an aspect of the present invention, an electronic device for use with site isolation protection is provided, wherein two sites have a set of engines. The electronic device comprises a first module detecting at least one of a first state of a data connection between the two sites and a second state of an existence of a link connection between the two sites; and a second module issuing a specific command to the set of engines when the first module determines that at least one of the first state and the second state meets a specific criterion.

The above objectives and advantages of the present invention will become more readily apparent to those ordinarily skilled in the art, after reviewing the following detailed descriptions and accompanying drawings, in which:

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 1:
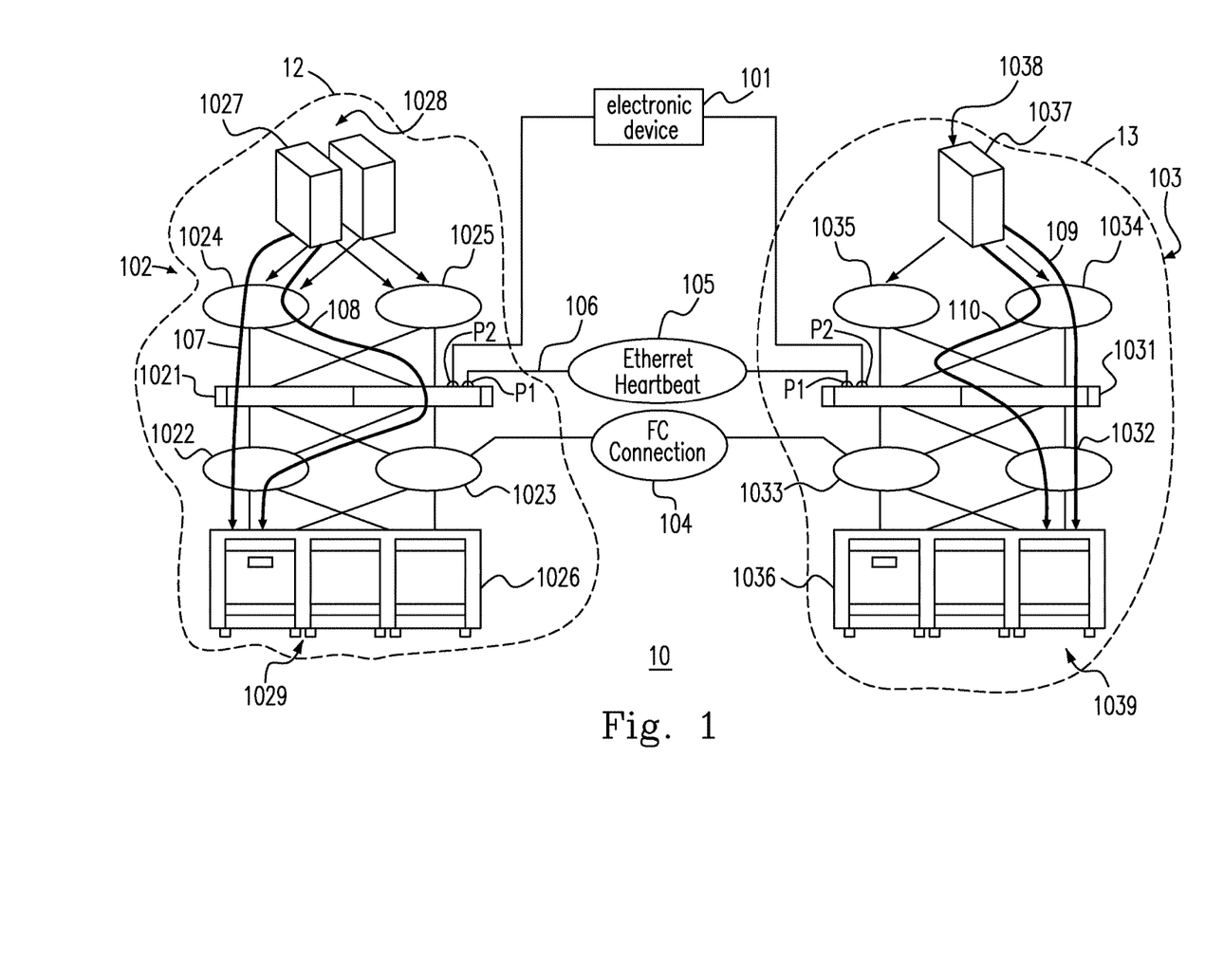
FIG. 1 shows an embodiment of a system for detecting site isolation.

Please refer to FIG. 1, which shows an embodiment of a system 10 for detecting site isolation. The system 10 includes an electronic device 101, a first device collection 12 at a first site 102, and a second device collection 13 at a second site 103. The first device collection 12 includes a first engine 1021, a first group FC switches 1022 and 1023, a second group FC switches 1024 and 1025, a storage array 1026 and a server 1027. The second device collection 13 includes a second engine 1031, a first group FC switches 1032 and 1033, a second group FC switches 1034 and 1035, a storage array 1036 and a server 1037. The first group FC switches 1022, 1023, 1032 and 1033 are electrically connected through a FC connection 104. To synchronize data between two sites 102 and 103 (or between the first and the second device collections 12 and 13), data transmission between two storage array 1026 and 1036 can be routed by the first group FC switches 1022, 1023, 1032 and 1033 and through FC connection 104. The engines 1021 and 1031 are clustered and are each local member of the first and the second device collections 12 and 13 for the first site 102 and the second site 103 respectively, and are also cross-site clustered members for each other at two different sites 102 and 103. It indicates that data access and synchronization can be performed at each local member, and more importantly, the data access and synchronization can be performed between the two sites 102, 103 in case one of the engines fails. The storage arrays 1026 and 1036 are local mirror members for the first site 102 and the second site 103 respectively, and are also cross-site mirror members for each other at two different sites 102 and 103. It indicates that data synchronization can be performed at each local mirror member, and more importantly, the data synchronization can be performed between the two sites 102, 103 to keep data consistent. The first engine 1021 and the second engine 1031 are electrically connected each other through the FC connection 104, and an Ethernet connection 106 having an Ethernet heartbeat (EH) 105. For example, the first and the second device collections 12 and 13 are respectively located in the first and the second sites 102 and 103. To avoid data inconsistency between the first and the second sites 102, 103, the first and the second engines 1021, 1031 always check whether other engine is out of order and needs to take over through the FC connection 104. If it detects the partner engine is out of order, it further checks whether the EH still exists. If the EH still exists, then it indicates that the first and the second engines 1021, 1031 is normal and the FC connection 104 is broken (which makes it think the partner engine is out of order), so an engine at a primary site (the first site 102) will continue operating, while another engine at a secondary site (the second site 103) will shut down to prevent data divergence, e.g., the first engine 1021 keeps operating and the second engine 1031 is shut down.

In some embodiments, in FIG. 1, there may be at least one first server 1028 included in the first device collection 12, and at least one second server 1038 included in the second device collection 13. The first device collection 12 may include at least two first storage devices 1029 containing first unique configuration information respectively and first data information respectively, and the second device collection 13 may include at least two second storage devices 1039 containing second unique configuration information respectively and second data information respectively. The first device collection 12 may include at least two first switches 1022 and 1024 connected to the at least one first server 1028 and the at least two first storage devices 1029 to form first multiple data paths (for example, 107 and 108) from the at least one first server 1028 to the at least two first storage devices 1029 via each of the at least two first switches 1022 and 1024. The second device collection 13 may include at least two second switches 1032 and 1034 connected to the at least one second server 1038 and the at least two second storage devices 1039 to form second multiple data paths (for example, 109 and 110) from the at least one second server 1038 to the at least two second storage devices 1039 via each of the at least two second switches 1032 and 1034.

In FIG. 1, the first engine 1021 is connected to the at least two first switches 1022 and 1024, is configured to detect health conditions of the at least two first storage devices 1029, and is configured to control the at least two first switches 1022 and 1024 to allow the at least one first server 1028 to access at least one of the at least two first storage devices 1029 through at least one of the first multiple data paths (for example, 107 and 108) according to their respective health conditions. The second engine 1031 is connected to the at least two second switches 1032 and 1034, is configured to detect health conditions of the at least two second storage devices 1039, and is configured to control the at least two second switches 1032 and 1034 to allow the at least one second server 1038 to access at least one of the at least two second storage devices 1039 through at least one of the second multiple data paths (for example, 109 and 110) according to their respective health conditions.

In FIG. 1, the system 10 may use a relatively high-speed transmission connection to transmit data substantially and use a relatively low-speed transmission connection to detect whether connection has been broken between the two sites 102, 103 (or between the first and the second device collections 12 and 13). If both connections fail, a service installed at the electronic device 101 can takeover through a network, which has a different IP domain from those IPs of two sites 102 and 103. The electronic device 101 can be a remote computing device or a client serving host that is used to run a service program to prevent data divergence. For example, the system 10 can use lower three layers of OSI (Open System Interconnect) model to detect whether the FC connection 104 is broken, whether the EH exists, or whether both of them fail to communicate with each other. If both of them fail to communicate with each other, then the service program takes appropriate actions to prevent data divergence between the storage arrays 1026 and 1036 at two sites 102, 103 in advance. In some embodiments, the first engine 1021 can detect physical layer (Layer 1) to know whether it still connects the second engine 1031 through the first group FC switches 1022, 1023, 1032 and 1033 and the FC connection 104, and vice versa. The first engine 1021 can detect data link layer (Layer 2) to know whether the second engine 1031 is still normal by detecting the EH 105 of Ethernet connection 106 from the second engine 1031, and vice versa.

In FIG. 1, each of the engines 1021 and 1031 includes a first port P1 and a second port P2, wherein the first port P1 is used to detect the EH 105 of the Ethernet connection 106 and the second port P2 is used for a quorum service. The quorum service is installed in the electronic device 101 to monitor the FC connection 104 and the EH 105 between the first site 102 and the second site 103 by detecting network layer (Layer 3). There are several isolation protection methods provided according to the aforementioned condition of the FC connection 104, the EB 105 of Ethernet connection 106 and the quorum service in Layer 1, 2 and 3 respectively. The quorum service is installed at the electronic device 101, wherein the electronic device 101 is in an IP domain being different from any one of the FC connection 104 and the Ethernet connection 106.

The EH 105 is detected through the first port P1 for management of a set of clustered engines, i.e., there may be more than one engine in the first site 102 or the second site 103, and there may be more than two sites in a cluster. The EH 105 is used to help distinguish an FC isolation case from a remote-site-down. When the FC isolation occurs, the first engine 1021 or the second engine 1031 can use the EH 105 to determine whether the other engine is down, or just the FC connection 104 is broken, and take appropriate action to prevent the split-brain condition.

In spite of being very unlikely, it is not impossible that both the FC connection 104 and the EH 105 between the two sites 102 and 103 go down at the same time, which is called "Total Isolation". Total Isolation will lead the system 10 into the dangerous split-brain condition.

Before the FC connection 104 is made, the EH 105 and the quorum service are enabled, the electronic device 101 for example, should firstly set corresponding internet protocol (IP) addresses, subnet mask and gateway address for the first engine 1021 and the second engine 1031 respectively, and establish a site management table at the first engine 1021 and the second engine 1031 in order to enable a site isolation service (SIS) through a telnet, wherein the site management table is configured to identify a primary engine and a secondary engine. For example, when the first device collection 12 has more than one engine, all of the engines at the first site 102 are set to primary. When the second device collection 13 has more than one engine, all of the engines at the second site 103 are set to secondary. For an enhanced security purpose, other protocol may be used to communicate between the electronic device 101 and the first and the second engines 1021 and 1031, which may be a better option as it encrypts communication between the electronic device 101 and the first and the second engines 1021 and 1031, thereby making it very difficult for others to gain access to a user's password and detect what the user is doing. The electronic device 101 may be a portable device, a laptop, a tablet, a mobile phone, a desktop computer, a workstation, a server, etc.

In some embodiments, please refer to the following telnet CLI (Command Line Interface), which shows preparation of the first engine 1021 and the second engine 1031 for SIS. Some commands below are useful to build site management tables.

site
   Print the contents of the current Site Management Tables, as well as status.
site erase
   Erase all site management tables and disable the service.
site <list of engine numbers for primary site>
   Activate (or change) the site SIS. The engines listed are used to identify the primary site. The engines not listed are used to identify the secondary site.
CLI>Site
Site isolation protection is currently enabled
There is currently no isolation condition

| Engine | Serial # | IP Address (1) | FC Status | IP Status | Site |
|---|---|---|---|---|---|
| >>1 | 600010 | 172.16.56.56 | active | beating | 0 |
| 2 | 600018 | 172.16.56.55 | active | beating | 1 |

The SIS will detect the physical layer status and the data link layer status, then take an optimum isolation protection when the above statuses meet a specific criterion. When the SIS is enabled, each engine in the set of cluster maintains the EH 105 handshake with each engine located in the other site. The EH 105 provides information required for the FC isolation protection process illustrated in the next pages. When the SIS is disabled, the EH 105 stops.

When the SIS is enabled, an evaluation is done every time the engines "re-sync" with their set of cluster engines 1021 and 1031. Typically, engine re-sync happens when engines 1021 and 1031 detect a change in the topology of an FC fabric, for example, when a transmission data path routed by the first group FC switch 1022, 1023, 1032 and 1033 changes. When the FC fabric change triggers the evaluation of FC isolation, the following steps are performed.

Figure 2:
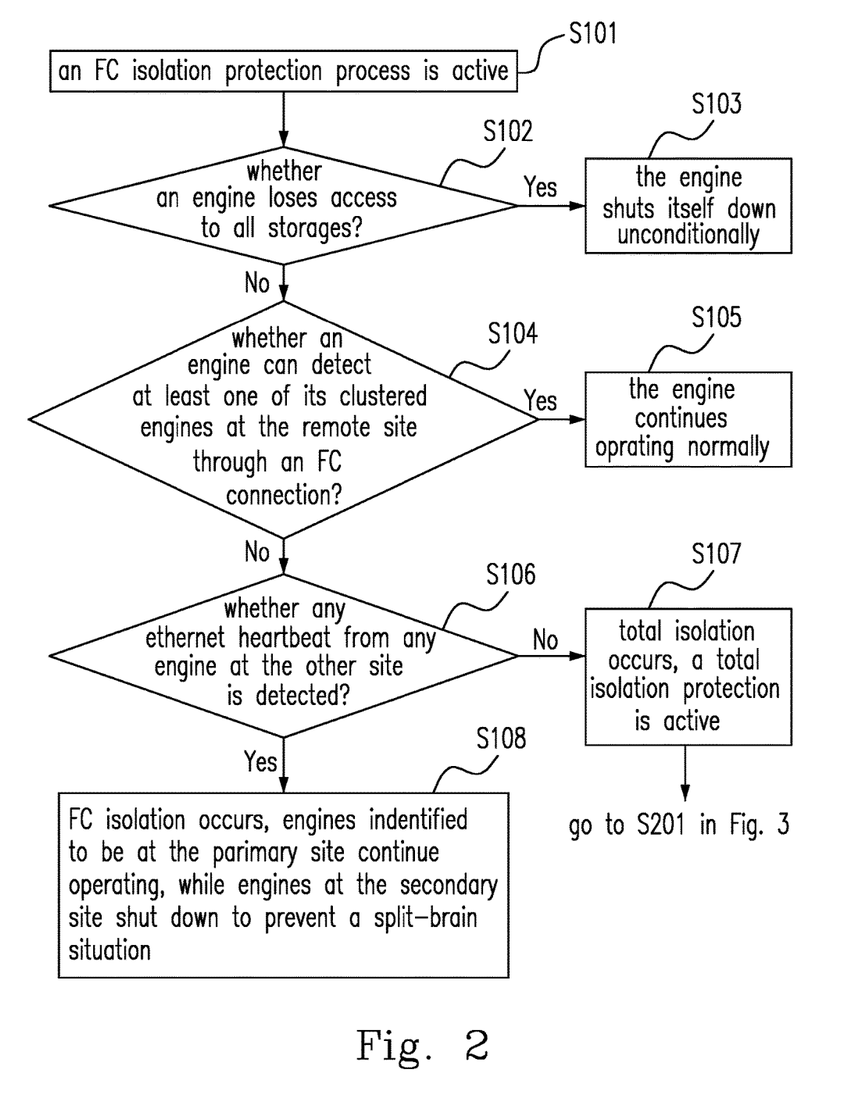
FIG. 2 shows an embodiment of an FC isolation protection process.

Please refer to FIG. 2, which shows an embodiment of an FC isolation protection process. In step S101, an FC isolation protection process is active. In step S102, a decision is made on whether an engine loses access to all storages. When the decision of step S102 is positive, a flow control of the process proceeds to Step S103. In step S103, the engine shuts itself down unconditionally. This way it assists other engines, which might still have access to storage, in making the proper decisions. For example, when the first engine 1021 loses access to all the storages at the storage array 1026, the first engine 1021 shuts itself down. When the second engine 1031 identified as a secondary engine can access any storage at the storage array 1036 and finds that the first engine 1021 shuts itself down, the second engine 1031 keeps itself running.

When the engine does not lose access to all storages or can access at least one storage (or when the decision of step S102 is negative), a flow control of the process proceeds to step S104. In step S104, a decision is made on whether an engine can detect at least one of its clustered engines at the remote site through an FC connection 104. When the decision of step S104 is positive, a flow control of the process proceeds to step S105. In step S105, the engine continues operating normally. For example, when the first engine 1021 can detect at least one engine at the second site 103 (the secondary site) through the FC connection 104, the first engine 1021 continues operating normally at the first site 102 (the primary site). Similarly, when the second engine 1031 can detect at least one engine at the first site 102 (the primary site) through the FC connection 104, the second engine 1031 continues operating normally at the second site 103 (the secondary site).

When the engine cannot detect at least one of its clustered engines at the remote site through the FC connection 104 (or when the decision of step S104 is negative), the Ethernet heartbeat data will be checked to determine whether a total isolation has occurred, i.e., a flow control of the process proceeds to step S106. In step S106, a decision is made on whether any Ethernet heartbeat from any engine at the other site is detected. When the decision of step S106 is negative, a flow control of the process proceeds to step S107. In step S107, total isolation occurs, and a total isolation protection is active. Otherwise, when at least one engine at the other site still has an active Ethernet heartbeat (or when the decision of step S106 is positive), a flow control of the process proceeds to step S108. In step S108, this situation is simply the FC isolation, so Ethernet heartbeat is still alive, i.e., physical layer's communication is broken, but data link layer's communication is still alive. In addition, in step S108, engines identified to be at the primary site continues operating, while engines at the secondary site shuts down to prevent a split-brain situation. For example, when the first engine 1021 at the first site 102 cannot detect the second engine 1031 at the second site 103 through the FC connection 104 by the first group FC switches 1022, 1023, 1032 and 1033, the Ethernet heartbeat 105 data from the first site 102 or the second site 103 is checked to make a first decision on whether any Ethernet heartbeat 105 from any engine at the remote site is detected. When the first decision is negative, the total isolation occurs, and a total isolation protection is active as in FIG. 3. When the first decision is positive, the first engine 1021 at the first site 102 (the primary site) continues operating, while the second engine 1031 at the second site 103 (the secondary site) shuts down to prevent a split-brain situation. The first engine 1021 may be identified as a secondary engine at the secondary site, and the second engine 1031 may be identified as a primary engine at the primary site. The quorum service daemon is designed to support the total isolation protection for the quorum service. This quorum service daemon is a program portable to any operating system, such as Windows, Linux or Mac OSX system.

In FIG. 1, before the total isolation protection is active, the quorum service should be installed at the electronic device 101. The quorum service should be set at the client site, for example, the electronic device 101, and should run in a different IP domain from that of the Ethernet Heartbeat 105, to avoid having both FC connection 104 and the Ethernet Heartbeat 105 fail due to a single network failure. In order to get total isolation support, it is necessary to upgrade firmware at the first engine 1021 and the second engine 1031, and each port P2 of the first and the second engines 1021, 1031 is used for quorum service communication. The quorum service daemon has a quorum file that includes an IP address of each engine. A plain text editor can be used to edit the quorum file to set the IP address of each engine.

In some embodiments, the following engine telnet CLI is provided to prepare the first and the second engines 1021 and 1031 (high availability engines) for quorum service management:
quorum
  Print the contents of the current Quorum Service table, as well as status.
CLI>Quorum
Site isolation quorum client is currently enabled.
Site isolation quorum server's IP address is 192.168.1.2.

| Engine | Serial # | IP Address (2) |
|---|---|---|
| >>1 | 600010 | 172.168.1.153 | quorum erase
  Erase the Quorum Service table, and disable use of the service.
quorum <IP>
  Set the IP address of the Quorum Service daemon. It also creates the Quorum Service table based on the contents of the Site Management Table, as well as other information known to the engine.

In some embodiments, when the FC connection 104 and the EH 105 communications have all failed, i.e., the total isolation situation occurs, one of two conditions should exist:

Condition 1: the engines at the remote site are indeed incapacitated, for example, powered off, or shut down because they don't detect any storage, etc.; or Condition 2: the engines at the remote site are still operational, and only the communication between sites is broken.

It is indistinguishable from the engines' point of view whether the total isolation results from failure of the remote site or failure of communication to the remote site. Therefore, the quorum service is helpful to determine whether the remote site engine is down or simply connection in-between is broken.

The quorum service running in the electronic device 101 at the client can be used to help resolve this total isolation situation. When total isolation occurs, the following steps are performed.

Figure 3:
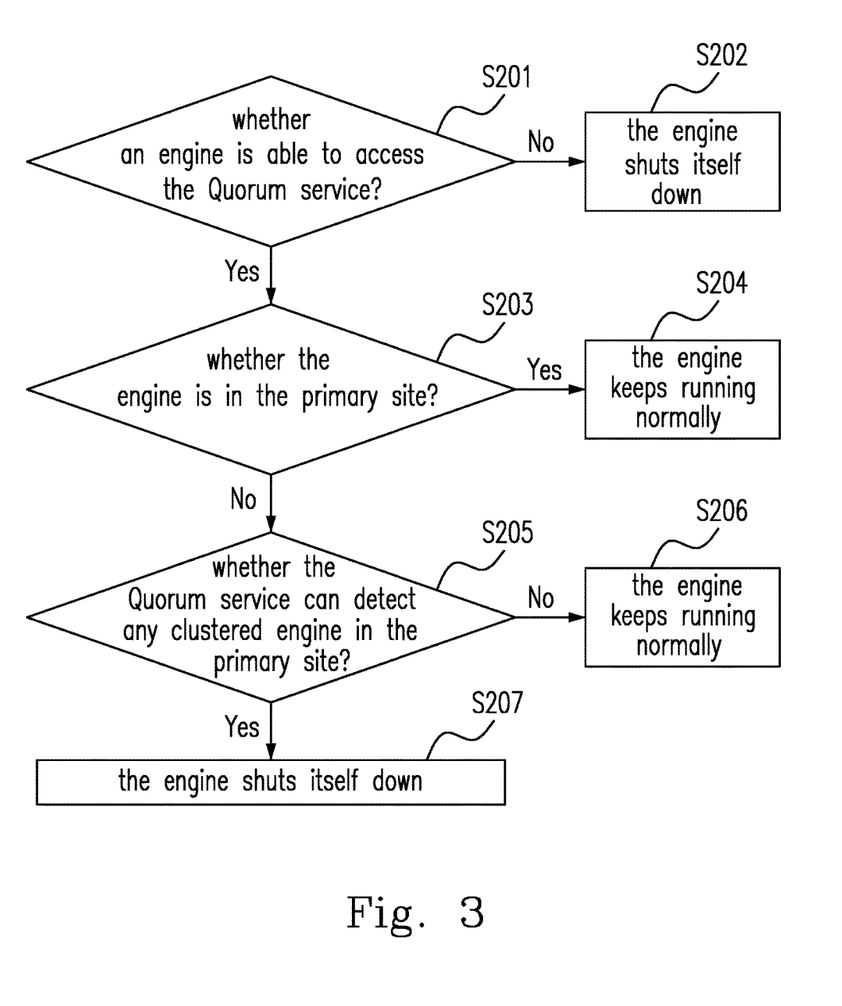
FIG. 3 shows an embodiment of a total isolation protection process.

Please refer to FIG. 3, which shows an embodiment of a total isolation protection process. In step S201, a decision is made on whether an engine is able to access the quorum service. When the decision of step S201 is negative, a flow control of the process proceeds to step S202. In step S202, the engine shuts itself down unconditionally. For example, when the first engine 1021 cannot access the quorum service, the first engine 1021 shuts itself down. Similarly, when the second engine 1031 cannot access the quorum service, the second engine 1031 shuts itself down.

When the engine is able to access the quorum service (or when the decision of step S201 is positive), a flow control of the process proceeds to step S203. In step S203, a decision is made on whether the engine is located at the primary site. When the decision of step S203 is positive, a flow control of the process proceeds to step S204. In step S204, the engine keeps running normally. For example, if the first engine 1021 can access the quorum service and is at the first site 102 (the primary site), then the first engine 1021 keeps running normally.

When the engine is not located at the primary site (or when the decision of step S203 is negative), a flow control of the process proceeds to step S205. In step S205, a decision is made on whether the quorum service can detect any clustered engine at the primary site. When the decision of step S205 is negative, a flow control of the process proceeds to step S206. In step S206, the engine keeps running normally. For example, when the second engine 1031 is not located at the first site 102 and cannot detect at least one engine at the first site 102 (the primary site), the second engine 1031 keeps running normally.

When the quorum service can detect any clustered engine at the primary site (or when the decision of step S205 is positive), a flow control of the process proceeds to step S207. In step S207, the engine shuts itself down. For example, when the second engine 1031 is located at the second site 103 rather than at the first site 102 (the primary site) and the second engine 1031 can detect the first engine 1021 via the quorum service, the second engine 1031 shuts itself down.

Please refer to Table 1, which shows the quorum service (QS) decision table in the electronic device 101.

TABLE 1

Total site isolation: FC connection & port P1 disconnected

| | | Primary site | Secondary site |
|---|---|---|---|
| QS detectable | QS detect Primary | — | Stop engine |
| | QS not detect Primary | — | Continue engine |
| QS not detectable | | Stop engine | Stop engine |

In Table 1, the dash line "----" means any engine at the primary site does not need to take any action. The "QS detectable" means any engine at the secondary site is detectable by the QS, and the "QS not detectable" means any engine at the primary site and the secondary site is not detectable by the QS. When the QS can detect any engine at the primary site, the engine at the primary site does not need to take any action, i.e., it keeps running. When QS cannot detect any engine at the primary site, the engine at the primary site does not need to take any action, i.e., it should already be down. When the QS can detect any engine at the secondary site, any engine at the second site continues running.

If the FC isolation or the total isolation occurs and the FC isolation protection and the total isolation protection are enabled, the recovery from the above isolation situation is straightforward. In some embodiments, to recover all engines, which have been previously shut down, when the FC isolation or the total isolation is detected, the following steps can be performed: 1. Restore the FC connection 104 and the Ethernet connection 106 between the first and the second sites 102, 103. 2. Reboot the first engine 1021 at the first site 102 and the second engine 1031 at the second site 103 that have been down.

In some embodiments, the FC isolation protection and the total isolation protection can also be applied to more than two sites because the electronic device 101 enabling the quorum service is in different IP domain from that of clustered sites. With the method of site isolation protection, the electronic device 101 and the system 10 uses the same method in the present disclosure, and the split-brain situation can be avoided among sites.

Figure 4:
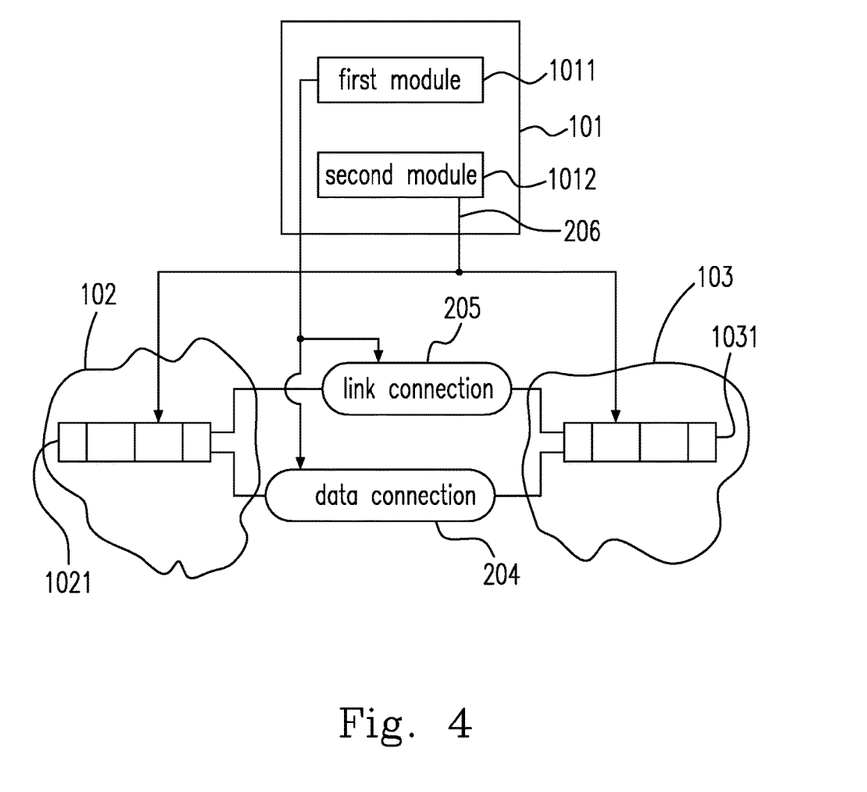
FIG. 4 shows an embodiment of an electronic device for use with site isolation protection.

Please refer to FIG. 4, which shows an embodiment of an electronic device 101 for use with site isolation protection. The electronic device 101 includes a first module 1011 and a second module 1012. The first module 1011 detects at least one of a first state of a data connection 204 between the two sites 102 and 103, and a second state of an existence of a link connection 205 between the two sites 102 and 103. The second module 1012 issues a specific command 206 to the set of engines 1021, 1031 when the first module 1011 determines that at least one of the first state and the second state meets a specific criterion. The specific criterion is as described in the aforementioned FIGS. 1-4 and Paragraphs.

To sum up, according to the present disclosure, each engine will decide whether the physical layer communication has failed by detecting whether it loses access to all the storages at their respective site. Any engine loses access to all the storages at their respective site will be considered as the physical layer communication failure. In addition, each engine will decide whether the physical layer communication has failed by detecting whether the second engine 1031 at the secondary site can detect the remote site engine through the FC connection 104. If the second engine 1031 at the secondary site does not lose access to all the storages 1036 at the secondary site and cannot detect the first engine 1021, it indicates that the FC isolation occurs, i.e., the physical layer communication among sites fails. This will result in synchronizing data only at the respective site alone, rather than synchronizing among different sites. In order to prevent data divergence during the synchronizing data process, the quorum service will know this information from port P2, and will shut down the first engine 1021 at the primary site and keep the second engine 1031 running to avoid the split-brain situation.

The data link layer communication should be checked when the physical layer communication has failed. Accordingly, each engine at each site can decide whether the data layer communication has also failed by detecting whether the Ethernet Heartbeat 105 is still alive at the remote site. If none of the Ethernet Heartbeat 105 exists, the quorum service installed in the different IP domain is helpful to monitor the FC connection 104 and the EH 105 because none of the clustered engines can provide the state of the FC connection 104 and the state of the EH 105. This is the total isolation situation.

If the total isolation occurs, the quorum service decides whether the network layer communication has failed by detecting whether each engine at each site can access the quorum service. An event that any engine loses access to the quorum service at their respective site will be considered as the network layer communication failure. In addition, the quorum service will decide whether the network layer communication has failed by detecting whether the second engine 1031 at the secondary site can detect the first engine 1021 (remote site engine, viewed from the second engine 1031) through the quorum service. If the second engine 1031 at the secondary site can access the quorum service and cannot detect the first engine 1021 (remote site engine, viewed from the second engine 1031) via the quorum service, it indicates the network layer communication among sites has failed. This will result in synchronizing data only at the respective site alone, rather than synchronizing among different sites. In order to prevent data divergence during the synchronizing data process, the quorum service will know this information from port P2, and will shut down the first engine 1021 at the primary site and keep the second engine 1031 running to avoid the split-brain situation.

EMBODIMENTS

1. A method of site isolation protection, comprising steps of: providing a set of clustered engines including a first engine at a first site and a second engine at a second site; providing a Fiber Channel (FC) connection and an Ethernet connection between the first and the second sites; detecting whether an Ethernet Heartbeat (EH) from one of the first engine and the second engine through the Ethernet connection exists when the FC connection fails; and shutting down one of the first engine and the second engine when the EH exists.

2. The method in Embodiment 1, further comprising steps of: setting corresponding internet protocol (IP) addresses respectively for the set of clustered engines; and installing a quorum service at a client site, wherein the client site is in an IP domain being different from any one of those of the FC connection and the Ethernet connection.

3. The method of any one of Embodiments 1 to 2, further comprising steps of: shutting down the first engine when the first engine cannot access all of the storages at the first site, and shutting down the second engine when the second engine cannot access all of the storages at the second site; and causing a local site engine in the set of clustered engines to continue to operate normally when the local site engine can access a remote site engine in the set of clustered engines through the FC connection.

4. The method of any one of Embodiments 1 to 3, wherein a quorum service is installed at a client site and monitors the FC connection and the EH.

5. The method of any one of Embodiments 1 to 4, further comprising steps of: establishing site management tables to enable a site isolation service (SIS) through a telnet, wherein the site management table is configured to identify a primary engine and a secondary engine; and keeping the primary engine operating while shutting down the secondary engine when the FC connection fails and the EH exists, wherein the first engine is the primary engine and the second engine is the secondary engine.

6. The method of any one of Embodiments 1 to 5, further comprising steps of: maintaining a handshake for the EHs from all engines located at the other site when the SIS is enabled; and providing information required for an FC isolation protection process.

7. The method of any one of Embodiments 1 to 6, further comprising steps of: enabling the SIS; re-synchronizing the first engine and the second engine in the set of clustered engines when an FC fabric of the FC connection changes; and re-evaluating the FC isolation protection process.

8. The method of any one of Embodiments 1 to 7, further comprising steps of: providing a quorum service; detecting whether the FC connection fails and the EH does not exist; keeping the first engine running when the first engine is able to access the quorum service, the FC connection fails and the EH does not exist; and determining whether to shut down the second engine when the second engine is able to access the quorum service.

9. The method of any one of Embodiments 1 to 8, further comprising steps of: shutting down any engine that cannot access the quorum service; and shutting down the second engine when the first engine is able to access the quorum service and the second engine can reach any engine at the first site, and otherwise keeping the second engine running.

10. The method of any one of Embodiments 1 to 9, wherein each engine in the set of clustered engines includes a first port for detecting the EH and a second port for performing the quorum service; the first engine and the second engine shut themselves down when the first engine and the second engine cannot access to the quorum service; and a failed communication between the first engine and the second engine causes a total isolation when neither of the first and the second engines can access the other, wherein the total isolation is a condition when the FC connection fails and the EH does not exist.

11. A system having site isolation protection, comprising a set of engines deployed at at-least-two sites; a first transmission connection between the at least two sites; a second transmission connection transmitting at least one transmission heartbeat (TH) between the at least two sites; and a service detecting at least one of a first state of the first transmission connection and a second state of an existence of the at least one TH, and issuing a specific command to the set of engines when the service determines that at least one of the first state and the second state meets a specific criterion.

12. The system in Embodiments 11, wherein at least one first server is at a first site; at least two first storage devices containing first unique configuration information and first data information respectively; at least two first switches are connected to the at least one first server and the at least two first storage devices, to form first multiple data paths from the at least one first server to the at least two first storage devices via each of the at least two first switches; a first engine is at a first site, wherein the first engine is connected to the at least two first switches, configured to detect health conditions of the at least two first storage devices, and configured to control the at least two first switches to allow the at least one first server to access at least one of the at least two first storage devices, through at least one of the first multiple data paths according to their respective health conditions; at least one second server is at a second site; at least two second storage devices containing second unique configuration information and second data information respectively; at least two second switches are connected to the at least one second server and the at least two second storage devices, to form second multiple data paths from the at least one second server to the at least two second storage devices via each of the at least two second switches; a second engine is at a second site, wherein the second engine is connected to the at least two second switches, configured to detect health conditions of the at least two second storage devices, and configured to control the at least two second switches to allow the at least one second server to access at least one of the at least two second storage devices through at least one of the second multiple data paths according to their respective health conditions; wherein: the FC connection connects the at least two first storage devices to the at least two second storage devices respectively; each of the first engine and the second engine includes a first port detecting an Ethernet heartbeat of the Ethernet connection, and a second port performing the service; and the Ethernet connection connects the first engine at the first site and the second engine at the second site.

13. The system of any one of Embodiments 11 to 12, wherein the set of engines include a first engine at a first site and a second engine at a second site; the first transmission connection is a relatively high-speed transmission connection; the second transmission connection is a relatively low-speed transmission connection; the relatively high-speed transmission is a fiber channel (FC) connection; the relatively low-speed transmission is an Ethernet connection; each Transmission Heartbeat (TH) is an Ethernet heartbeat (EH); the service is a quorum service; a local site engine in the set of clustered engines continues to operate normally when the local site engine can access a remote site engine in the set of engines through the FC connection; and the quorum service shuts down one of the first engine and the second engine when the quorum service detects that the first state of the FC connection is broken and the second state of the at least one EH exists.

14. The system of any one of Embodiments 11 to 13, wherein the set of engines include a first engine at a first site and a second engine at a second site; the quorum service shuts down the first engine when the first engine cannot access any of the storages at the first site, and shuts down the second engine when the second engine cannot access any of the storages at the second site; and a local site engine in the set of engines continues to operate normally when the local site engine can access a remote site engine in the set of engines through the FC connection.

15. The system of any one of Embodiment 11 to 14, wherein the set of engines include a first engine at a first site and a second engine at a second site; the quorum service keeps the first engine running when the first engine is able to access the quorum service while both the FC connection and the Ethernet connection have failed; and the service shuts down the second engine when the second engine can reach any engine at the first site, otherwise the service keeps the second engine running.

16. The system of Embodiments 11 to 15, wherein the set of engines include a first engine at a first site and a second engine at a second site; the quorum service establishes site management tables to enable a site isolation service (SIS) through a telnet, wherein the site management table is configured to identify a primary engine and a secondary engine; the quorum service set corresponding internet protocol (IP) addresses for the set of engines; the quorum service keeps the primary engine operating and shuts down the secondary engine when the FC connection fails and the EH exists, wherein the first engine is the primary engine and the second engine is the secondary engine; and the service is installed at a client site, wherein the service is a quorum service and the client site is in an IP domain being different from those of the FC connection and the Ethernet connection.

17. An electronic device for use with site isolation protection, wherein two sites each has a set of engines, comprising: a first module detecting at least one of a first state of a data connection between the two sites, and a second state of an existence of a link connection between the two sites; and a second module issuing a specific command to the set of engines when the first module determines that at least one of the first state and the second state meets a specific criterion.

18. The electronic device in Embodiments 17, wherein the data connection is a fiber channel (FC) connection, and the link connection is an Ethernet connection transmitting at least one Ethernet heartbeat (EH); the first state occurs when the data connection fails or succeeds, and the second state occurs when the link connection fails or succeeds; the set of engines include a first engine at a first site and a second engine at a second site; the first module detects whether an EH from one of the first and the second engines through the Ethernet connection exist when the FC connection fails; the second module shuts down one of the first and the second engines when the EH from one of the first and the second engines exists; the second module shuts down the first engine according to the specific command when the first engine cannot access any of the storages at the first site, and shuts down the second engine when the second engine cannot access any of the storages at the second site; the second module causes a local site engine in the set of clustered engines to continue to operate normally when the local site engine can access a remote site engine in the set of engines through the FC connection; and a quorum service is installed at a client site and monitors the FC connection and the EH.

19. The electronic device of any one of Embodiments 17 to 18, wherein the data connection is a fiber channel (FC) connection, and the link connection is an Ethernet connection transmitting at least one Ethernet heartbeat (EH); the electronic device determines corresponding internet protocol (IP) addresses respectively for the set of engines; a quorum service is installed at the electronic device, wherein the electronic device is in an IP domain different from either one of those of the FC connection and the Ethernet connection; the quorum service monitors the first state of the FC connection and the second state of the at least one EH in the set of the engines; the electronic device establishes site management tables to enable a site isolation service (SIS) through a telnet, wherein the site management table is configured to identify a primary engine and a secondary engine; the second module keeps the primary engine operating and shuts down the secondary engine when the FC connection fails and the at least one EH exists, wherein the set of engines include the first and the second engines, the first engine is the primary engine and the second engine is the secondary engine.

20. The electronic device of any one of Embodiments 17 to 19, wherein the data connection is a fiber channel (FC) connection, and the link connection is an Ethernet connection transmitting at least one Ethernet heartbeat (EH); the set of engines include a first engine at a first site and a second engine at a second site; a quorum service is installed at the electronic device; the first module detects whether the FC connection fails and the at least one EH does not exist; the second module keeps the first engine running when the first engine is able to access the quorum service, the FC connection fails and the at least one EH does not exist; the second module determines whether to shut down the second engine when the second engine is able to access the quorum service; the second module shuts down any engine which cannot access the quorum service; and the second module shuts down the second engine when the second engine can reach any engine at the first site, and otherwise keeps the second engine running; each engine in the set of engines includes a first port detecting the (EH) of the Ethernet connection and a second port performing the quorum service; the first engine and the second engine shut themselves down when the first engine and the second engine cannot access the quorum service; and a failed communication between the first engine and the second engine causes a total isolation when neither of the first engine and the second engine can access the other, wherein the total isolation is a condition that the FC connection fails and the EH does not exist.

While the invention has been described in terms of what is presently considered to be the most practical and preferred Embodiments, it is to be understood that the invention does not need to be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method of site isolation protection, comprising steps of:
   providing a set of clustered engines including a first engine at a first site and a second engine at a second site;
   providing a Fiber Channel (FC) connection and an Ethernet connection between the first and the second sites;
   providing a quorum service;
   detecting whether an Ethernet Heartbeat (EH) from one of the first engine and the second engine through the Ethernet connection exists when the FC connection fails;
   shutting down one of the first engine and the second engine when the EH exists;
   shutting down any engine which cannot access the quorum service; and
   shutting down the second engine when the first engine is able to access the quorum service and the second engine can reach any engine at the first site, and otherwise keeping the second engine running.

2. A method as claimed in claim 1, further comprising steps of:
   setting corresponding internet protocol (IP) addresses respectively for the set of clustered engines; and
   installing a quorum service at a client site, wherein the client site is in an IP domain being different from any one of those of the FC connection and the Ethernet connection.

3. A method as claimed in claim 1, further comprising steps of:
   shutting down the first engine when the first engine cannot access any of the storages at the first site, and shutting down the second engine when the second engine cannot access any of the storages at the second site; and
   causing a local site engine in the set of clustered engines to continue to operate normally when the local site engine can access a remote site engine in the set of clustered engines through the FC connection.

4. A method as claimed in claim 1, wherein:
a quorum service is installed at a client site and monitors the FC connection and the EH.

5. A method as claimed in claim 1, further comprising steps of:
establishing site management tables to enable a site isolation service (SIS) through a telnet, wherein the site management table is configured to identify a primary engine and a secondary engine; and
keeping the primary engine operating while shutting down the secondary engine when the FC connection fails and the EH exists, wherein the first engine is the primary engine and the second engine is the secondary engine.

6. A method as claimed in claim 5, further comprising:
maintaining a handshake for the EHs from all engines located at the other site when the SIS is enabled; and
providing information required for an FC isolation protection process.

7. A method as claimed in claim 6, further comprising steps of:
enabling the SIS;
re-synchronizing the first engine and the second engine in the set of clustered engines when an FC fabric of the FC connection changes; and
re-evaluating the FC isolation protection process.

8. A method as claimed in claim 1, comprising steps of:
detecting whether the FC connection fails and the EH does not exist;
keeping the first engine running when the first engine is able to access the quorum service, the FC connection fails and the EH does not exist; and
determining whether to shut down the second engine when the second engine is able to access the quorum service.

9. A method as claimed in claim 8, wherein:
each engine in the set of clustered engines includes a first port for detecting the EHI and a second port for performing the quorum service;
the first engine and the second engine shut themselves down when the first engine and the second engine cannot access the quorum service; and
a failed communication between the first engine and the second engine causes a total isolation when neither of the first and the second engines can access to the other, wherein the total isolation is a condition when the FC connection fails and the Eli does not exist.

10. A system having site isolation protection, comprising:
a set of engines including a first engine at a first site and a second engine at a second site, and deployed at at-least-two sites;
a first transmission connection between the at least two sites;
a second transmission connection transmitting at least one transmission heartbeat (TH) between the at least two sites; and
a quorum service detecting at least one of a first state of the first transmission connection and a second state of an existence of the at least one TH, and issuing a specific command to the set of engines when the quorum service determines that at least one of the first state and the second state meets a specific criterion, including:
shutting down any engine which cannot access the quorum service; and
shutting down the second engine when the first engine is able to access the quorum service and the second engine can reach any engine at the first site, and otherwise keeping the second engine running.

11. A system as claimed in claim 10, further comprising:
at least one first server at a first site;
at least two first storage devices containing first unique configuration information and first data information respectively;
at least two first switches are connected to the at least one first server and the at least two first storage devices, to form first multiple data paths from the at least one first server to the at least two first storage devices via each of the at least two first switches,
wherein the first engine is connected to the at least two first switches, configured to detect health conditions of the at least two first storage devices, and configured to control the at least two first switches to allow the at least one first server to access at least one of the at least two first storage devices through at least one of the first multiple data paths according to their respective health conditions;
at least one second server at a second site;
at least two second storage devices containing second unique configuration information and second data information respectively;
at least two second switches are connected to the at least one second server and the at least two second storage devices, to form second multiple data paths from the at least one second server to the at least two second storage devices via each of the at least two second switches,
wherein the second engine is connected to the at least two second switches, configured to detect health conditions of the at least two second storage devices, and configured to control the at least two second switches to allow the at least one second server to access at least one of the at least two second storage devices through at least one of the second multiple data paths according to their respective health conditions; wherein:
the FC connection connects the at least two first storage devices to the at least two second storage devices respectively;
each of the first engine and the second engine includes a first port detecting an Ethernet heartbeat of the Ethernet connection, and a second port performing the service; and
the Ethernet connection connects the first engine at the first site and the second engine at the second site.

12. A system as claimed in claim 10, wherein:
the first transmission connection is a relatively high-speed transmission connection;
the second transmission connection is a relatively low-speed transmission connection;
the relatively high-speed transmission is a fiber channel (FC) connection;
the relatively low-speed transmission is an Ethernet connection;
each Transmission Heartbeat (TH) is an Ethernet heartbeat (EH);
the service is a quorum service;
a local site engine in the set of clustered engines continues to operate normally when the local site engine can access a remote site engine in the set of engines through the FC connection; and
the quorum service shuts down one of the first engine and the second engine when the quorum service detects that the first state of the FC connection is broken and the second state of the at least one EH exists.

13. A system as claimed in claim 10, wherein:
the set of engines include a first engine at a first site and a second engine at a second site;
the quorum service shuts down the first engine when the first engine cannot access any of the storages at the first site, and shuts down the second engine when the second engine cannot access any of the storages at the second site; and
a local site engine in the set of clustered engines continues to operate normally when the local site engine can access a remote site engine in the set of engines through the FC connection.

14. A system as claimed in claim 10, wherein:
the set of engines include a first engine at a first site and a second engine at a second site;
the quorum service keeps the first engine running when the first engine is able to access the service and both the FC connection and the Ethernet connection fail; and
the quorum service shuts down the second engine when the second engine can reach any engine at the first site, and otherwise the service keeps the second engine running.

15. A system as claimed in claim 10, wherein:
the set of engines include a first engine at a first site and a second engine at a second site;
the quorum service establishes site management tables to enable a site isolation service (SIS) through a telnet, wherein the site management table is configured to identify a primary engine and a secondary engine;
the quorum service sets corresponding internet protocol (IP) addresses for the set of engines;
the quorum service keeps the primary engine operating and shuts down the secondary engine when the FC connection fails and the EH exists, wherein the first engine is the primary engine and the second engine is the secondary engine; and
the quorum service is installed at a client site, wherein the client site is in an IP domain being different from those of the FC connection and the Ethernet connection.

16. An electronic device in which a quorum service is installed, for use with site isolation protection, wherein two sites each has a set of engines, comprising:
a first module detecting at least one of a first state of a data connection between the two sites, and a second state of an existence of a link connection between the two sites; and
a second module issuing a specific command to the set of engines when the first module determines that at least one of the first state and the second state meets a specific criterion, wherein the set of engines includes a first engine at a first site and a second engine at a second site, and the specific criterion includes:
shutting down any engine which cannot access the quorum service; and
shutting down the second engine when the first engine is able to access the quorum service and the second engine can reach any engine at the first site, and otherwise keeping the second engine running.

17. An electronic device as claimed in claim 16, wherein:
the data connection is a fiber channel (FC) connection, and the link connection is an Ethernet connection transmitting at least one Ethernet heartbeat (EH);
the first state occurs when the data connection fails or succeeds, and the second state occurs when the link connection fails or succeeds;
the first module detects whether an EH from one of the first and the second engines through the Ethernet connection exist when the FC connection fails;
the second module shuts down one of the first and the second engines when the EH from one of the first and the second engines exists;
the second module shuts down the first engine according to the specific command when the first engine cannot access any of the storages at the first site, and shuts down the second engine when the second engine cannot access any of the storages at the second site;
the second module causes a local site engine in the set of clustered engines to continue to operate normally when the local site engine can access a remote site engine in the set of engines through the FC connection; and
a quorum service is installed at a client site and monitors the FC connection and the EH.

18. An electronic device as claimed in claim 16, wherein:
the data connection is a fiber channel (FC) connection, and the link connection is an Ethernet connection transmitting at least one Ethernet heartbeat (EH);
the electronic device determines corresponding internet protocol (IP) addresses respectively for the set of engines;
the electronic device is in an IP domain different from either one of those of the FC connection and the Ethernet connection;
the quorum service monitors the first state of the FC connection and the second state of the at least one EH in the set of the engines;
the electronic device establishes site management tables to enable a site isolation service (SIS) through a telnet, wherein the site management table is configured to identify a primary engine and a secondary engine;
the second module keeps the primary engine operating and shuts down the secondary engine when the FC connection fails and the at least one EH exists, wherein the set of engines include the first and the second engines, the first engine is the primary engine and the second engine is the secondary engine.

19. An electronic device as claimed in claim 16, wherein:
the data connection is a fiber channel (FC) connection, and the link connection is an Ethernet connection transmitting at least one Ethernet heartbeat (EH);
the set of engines include a first engine at a first site and a second engine at a second site;
a quorum service is installed at the electronic device;
the first module detects whether the FC connection fails and the at least one EH does not exist;
the second module keeps the first engine running when the first engine is able to access the quorum service, the FC connection fails and the at least one EH does not exist;
the second module determines whether to shut down the second engine when the second engine is able to access the quorum service;
the second module shuts down any engine which cannot access the quorum service;

the second module shuts down the second engine when the second engine can reach any engine at the first site, and otherwise keeps the second engine running;

each engine in the set of engines includes a first port detecting the (EH) of the Ethernet connection and a second port performing the quorum service;

the first engine and the second engine shut themselves down when the first engine and the second engine cannot access the quorum service; and a failed communication between the first engine and the second engine causes a total isolation when neither of the first engine and the second engine can access to the other, wherein the total isolation is a condition that the FC connection fails and the EH does not exist.

* * * * *